H. FÖTTINGER.
ROTARY GAS ENGINE.
APPLICATION FILED NOV. 13, 1914. RENEWED JAN. 11, 1918.

1,256,674.

Patented Feb. 19, 1918.
5 SHEETS—SHEET 1.

Witnesses

Inventor

H. FÖTTINGER.
ROTARY GAS ENGINE.
APPLICATION FILED NOV. 13, 1914. RENEWED JAN. 11, 1918.

1,256,674.

Patented Feb. 19, 1918.
5 SHEETS—SHEET 2.

H. FÖTTINGER.
ROTARY GAS ENGINE.
APPLICATION FILED NOV. 13, 1914. RENEWED JAN. 11, 1918.

1,256,674.

Patented Feb. 19, 1918.
5 SHEETS—SHEET 4.

Witnesses
A. Pauline Davis
W. Wallace Nairn Jr

Inventor
Hermann Föttinger
By Sowell & Sowell
His Attorneys

H. FÖTTINGER.
ROTARY GAS ENGINE.
APPLICATION FILED NOV. 13, 1914. RENEWED JAN. 11, 1918.

1,256,674.

Patented Feb. 19, 1918.
5 SHEETS—SHEET 5.

UNITED STATES PATENT OFFICE.

HERMANN FÖTTINGER, OF ZOPPOT, NEAR DANZIG, GERMANY.

ROTARY GAS-ENGINE.

1,256,674.　　　　　Specification of Letters Patent.　　Patented Feb. 19, 1918.

Application filed November 13, 1914, Serial No. 871,980. Renewed January 11, 1918. Serial No. 211,460.

*To all whom it may concern:*

Be it known that I, HERMANN FÖTTINGER, a subject of the King of Bavaria, residing at No. 13 Baedeckerweg, Zoppot, near Danzig, in Germany, have invented new and useful Improvements in Rotary Gas-Engines, of which the following is a specification.

The invention relates to rotary gas engines of the turbine type in which an auxiliary fluid is used as a medium for transmitting the power to the rotary part of the engine, when the driving gases produced by the combustion are mixed with, and acts upon the said fluid which circulates within the operative parts of the engine.

The object of the invention is to provide a construction in which the static energy of the combustion gases will be utilized directly without its previous conversion into kinetic energy or velocity, as is customary in known apparatus.

This object is attained by so devising the circuit of the auxiliary or transmitting medium within stationary and rotary parts of the engine, that the generation of the driving medium can take place in a rotating combustion chamber, whereupon the gases are introduced into the rotary part of the circuit under high pressure and with a velocity which approximates that of the auxiliary fluid circulating in the same direction, so that the energy of the gas is transmitted to the said fluid; the expansion of the mixture then actuating the turbine.

It is understood that the driving medium or fuel to be burnt in the engine may be a permanent gas or a liquid combustible, such as hydro-carbons or the like.

In the accompanying drawings which form a part of this specification, several constructions embodying the invention are illustrated.

Fig. 13 is a vertical longitudinal section of a further modification of the turbine, of which Fig. 14 represents a partial cross-section on the broken dotted line A—B in Fig. 13.

Fig. 15 illustrates a side view and partial section of a combination of several turbines.

Like numerals denote like parts throughout all figures of the drawing.

Figures 1, 2:
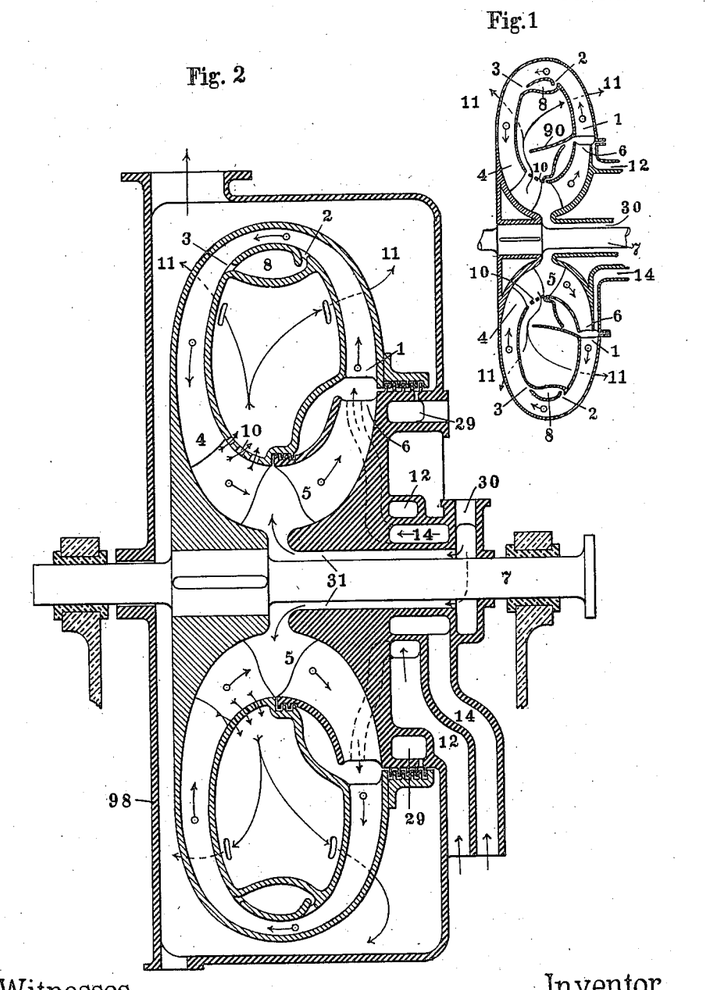
Figure 1 is a diagrammatic sectional elevation of the circuit.
Fig. 2 is a vertical cross-section of a gas engine constructed in accordance with the invention.

In order to explain the principle and the operation of the new engine, reference is first had to the diagrammatic Fig. 1 which represents as an example an axial section of a gas-turbine constructed and working according to the invention. 1—2—3—4 denote a rotor of the usual turbine type, having a series of blades or vanes secured to the main shaft 7, said blades encircling a stationary guide member 5—6, which can be firmly connected to the base or a casing which incloses the whole apparatus. The rotating member 1—4 and the guide member 5—6 provided with channels in which the fluid constantly circulates through 1—2—3—4—5—6—1 in the direction of the annulate arrows marked therein. 8 represents a combustion chamber into which gas or oil and air are introduced under a high pressure.

Supposing the rotating-member part 1—4 and the guide-member wheel 5—6 are filled with a liquid, e. g. oil or water, and the rotor be set in a quick rotation, then the liquid will be held in the channel section 2 to 3 at a high pressure which decreases considerably and gradually in the direction of 2 to 1 and 3 to 4. If the burnt and glowing gases from the combustion chamber 8, which are in the form of bubbles, are now mixed at the part 3 with the stream of the auxiliary liquid, the latter will carry the gas-bubbles toward 4, i. e. into the region of low pressure, where the gas-bubbles will expand considerably and increase their volume many times. The result of this is that the total volume (liquid and burnt gas) which every second reaches the point 4, is considerably larger than the volume of the liquid alone which passes every second; that is to say, the velocity of the mixture (liquid and contained gas bubbles) increases, according as more gases are mixed in at the point 3.

This increase of the velocity of the current toward 4 is due to the fact that owing to their expansion the burnt gases transmit power to the liquid. It is well known that a liquid flowing from outside inward in a suitable turbine-wheel exerts a driving impulse on this turbine-wheel in the same manner as in the case of the usual water-turbines.

By suitably shaping the channels, the result can be obtained that the expanded burnt gases are driven out of the current of liquid near the point 4, escaping, for instance, through the holes 10, and then, for example, through slits between the single channels of the rotating-part in the direction of the arrows 10 to 11, out of the rotating-member part into the atmosphere or into an exhaust-chamber or elsewhere, for example, into a second gas-engine of like or different construction.

The supply of gas or oil and air can be introduced, after a previous compression in a compressor of any suitable type, directly into the combustion-chamber 8. The engine hereinafter described may however be so constructed that the gaseous fuel with the help of the circulating auxiliary liquid itself is put under pressure and conveyed into the combustion chamber 8. For this purpose the gases, either separated or mixed, can near the point 6 of the guide-wheel at a low pressure be mixed with the auxiliary liquid which carries them into the rotating-part from 1 to 2; at the same time they are put under a high pressure and, given a suitable shaping of the channels, forced into the combustion-chamber 8 at the point 2. Herein they are ignited by any suitable means such as a sparking plug 36 (Fig. 16) or inflame on the glowing walls of the chamber and are then, after being completely burnt, again mixed at 3 with the auxiliary liquid which has meanwhile continued its circulation in separate channels from 2 to 3.

Figures 10, 11, 17:
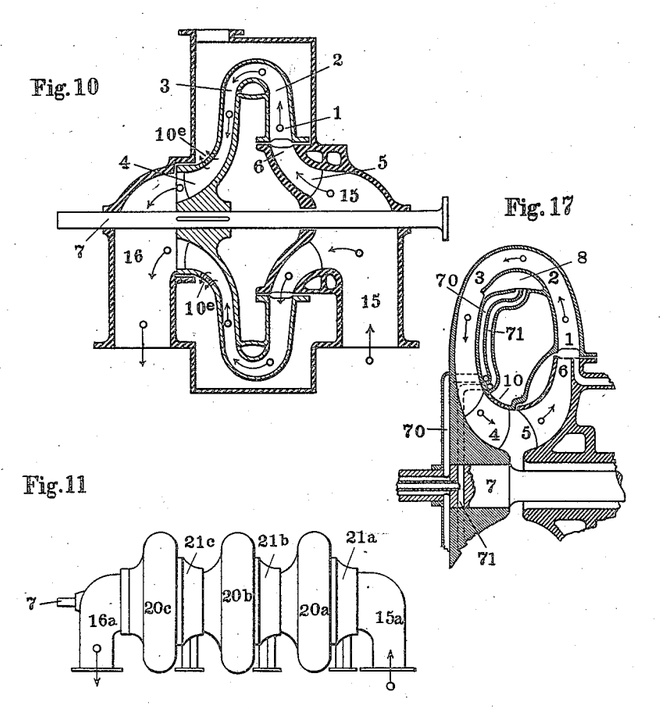
Fig. 10 is a vertical longitudinal sectional elevation of a modified construction in which the circulating auxiliary liquid is constantly renewed or changed.
Fig. 11 represents the side view of a similar but multiple arrangement of the turbine.
Figs. 16 and 17 illustrate further details and modifications of the gas-turbine in vertical longitudinal sections of the engine.

In the modification shown in Fig. 17 the fuel and the air are admitted through the shaft and separate pipes 70 and 71 leading directly into the combustion chamber 8.

The essential feature in the operation of this device is the fact that the gases which have been burnt under a practically constant high pressure in a combustion-chamber are mixed with a liquid which flows continually in the same direction with a comparatively small velocity and then, expanding and transmitting power, are carried with the liquid through the turbine-like channels (from 3 to 4) of the rotating-member part and are finally blown out of the liquid. As hereinbefore disclosed the combustible gases may be supplied under pressure, but such introductory compression may be dispensed with and the gases may be introduced into the auxiliary liquid flowing outward (from 1 to 2) at the point 1 of the rotating-member part; they are then put under pressure by the rotating liquid and conveyed into the combustion-chamber. When the combustion takes place the gases are mixed a second time with the liquid, as described above, expand and are at last removed. This new method of operation is fundamentally different from all former solutions of the gas-turbine problem.

The burnt gases need not be given a great rapidity of movement; they are mixed with the current of the auxiliary liquid at about the same velocity. The gases thereby enter the moderately flowing liquid in the form of bubbles. This system renders it possible to utilize the expansion-power of the gases even at 100 atmospheres of the combustion pressure, and with comparatively small peripheral velocity (150–160 m/sec.) in one single rotor.

In the diagrammatically shown device of Fig. 1 the auxiliary liquid after having transmitted power to the rotating part 1, 2, 3, 4, owing to the effect of the burnt gases, is then conveyed immediately back into guide wheel 5 to 6 and from this into the rotating part, thereby obtaining a suitable direction and velocity of current.

Figure 3:
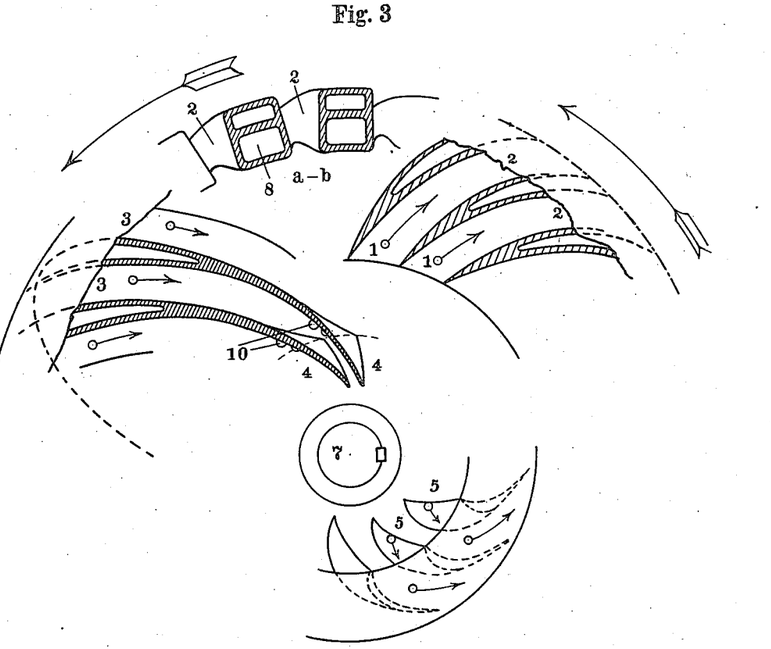
Fig. 3 represents several diagrammatic sections of the curved vanes and channels of different places of the circuit shown in Fig. 2.
Figure 4:
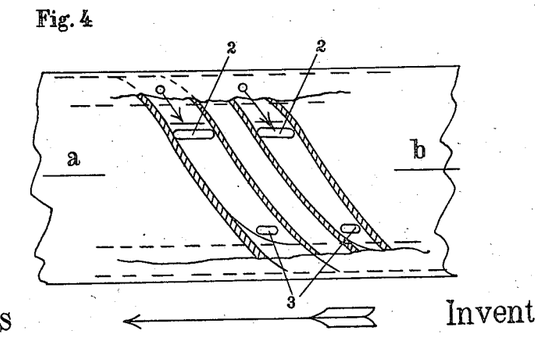
Fig. 4 is a sectional elevation of the peripheral summit of the circuit shown in Fig. 2.

At the left of Fig. 3 are shown, in section perpendicular to the axle, the vanes of the inward-leading branch 3 to 4 and at the right are those of the outward-leading branch 1 to 2, while above in the middle a transverse section of the combustion chambers on the line a—b of Fig. 4 is represented; below the vanes of the guide-wheel are represented in a perspective view. Fig.

4 is a longitudinal section of the channels of the rotor between the points 2 and 3.

This construction therefore forms a close circuit 1—2—3—4—5—6—1 of the auxiliary liquid, which circuit has the form of a hollow ring or vortex or curling ring (Figs. 1 and 2). This secures the advantage of utilizing the greatest amount of energy and of a very compact construction without pipes for admission or exhaust of the main stream of liquid. For cooling purposes it is only necessary to lead off a very small part of the liquid circulating in the circuit; and by means of a pump, an elevated tank, or by the sucking effect of the circulating stream bringing such diverted liquid back in a cooled condition. The introduction of the cool liquid takes place to best advantage near the axle of the rotating-member part or into the guide-member wheel through the channels 30 and 31 (Fig. 2) and for the emission of a part of the hot liquid the packing between 6 and 1 serves best out of which a certain amount is permitted to escape into the ring channel 29.

Figure 12:
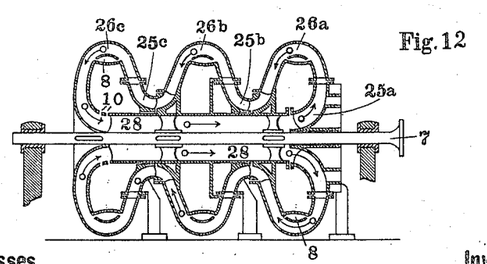
Fig. 12 is a diagrammatic vertical longitudinal section of a further modification of this multiple turbine.

Instead of the simple oval shape of the circuit illustrated in Figs. 1 and 2, a circuit interrupted between the points 4 and 5 may be employed according to Fig. 10, where the auxiliary liquid is conveyed from outside through the pipe or bend 15 into the stationary guide-wheel 5—6, while the liquid leaving the rotor at the point 4 may be received by a discharge pipe 16. Thus a stream of liquid can be conducted into and out of the turbine, or the pipes 15 and 16 may be connected by a by-pass or a tank for obtaining constant circulation of the same liquid, as will easily be understood. This arrangement is especially useful when a number of turbines of the kind described are connected in series, as represented in Figs. 11 and 12.

In Fig. 11 three guide-wheels 21$^a$, 21$^b$, 21$^c$ and three rotating turbine-wheels 20$^a$, 20$^b$, 20$^c$ of the construction herebefore described are provided and passed through, the one set after the other, by the liquid. As illustrated in Fig. 12 the auxiliary liquid which has been operative in the guide-wheels 25$^a$, 25$^b$, 25$^c$ and turbine-wheels 26$^a$, 26$^b$, 26$^c$ is led back from the wheel 26$^c$ to the wheel 25$^a$ by a central tube 28 encircling the shaft 7. A common exhaust 10 can be provided, if so preferred.

The burnt gases may escape, after having transmitted their energy, or they can after their partial expansion be admitted to a second turbine of the same construction or to a low-pressure steam-turbine of any well known type, where the remaining energy is utilized.

Figures 13, 14, 15:
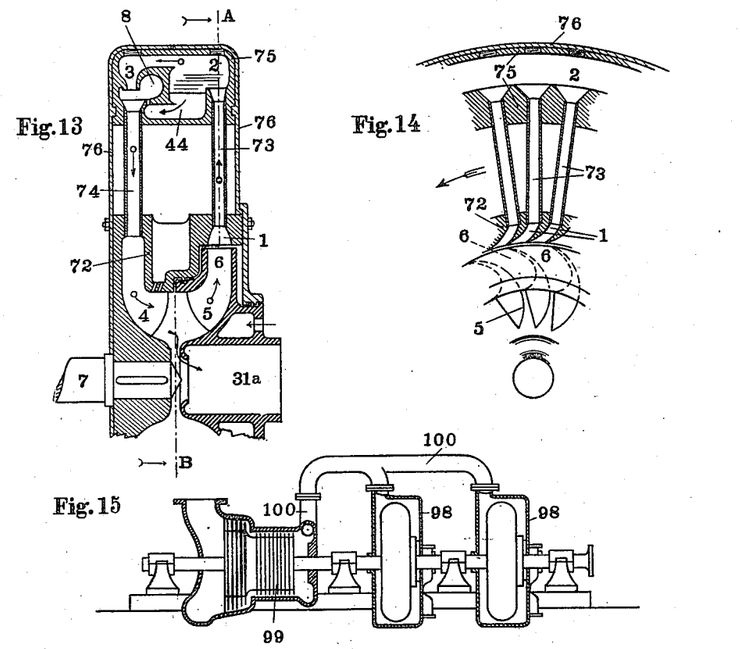

As illustrated in Fig. 15, for this purpose it is preferable to admit the gases into the engine hereinbefore described with a high initial pressure as well as the auxiliary fluid may be used with high pressure, so that further expansion of the gas will be possible. In the construction shown in Fig. 15 the gases collected in the exhaust chambers 98 of two gas turbines are led by means of pipes 100 into a low pressure turbine of any known construction, for example a drum-shaped turbine 99 operating without an auxiliary liquid.

Figure 5:
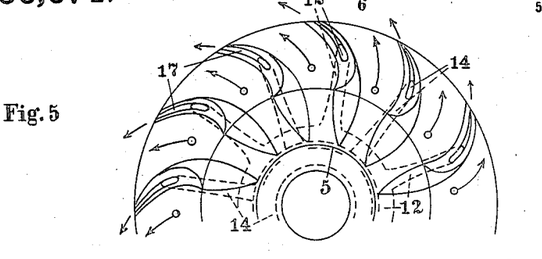
Fig. 5 is a diagrammatic representation of the stationary guide-wheel of Fig. 2.

The supply of gas and air can also be effected by the sucking-action of the circulating auxiliary liquid, for instance, at 6 or 1 in Fig. 2, or with the help of suitable air and gas channels 12 and 14 or through special supply-pumps or the like of any type. The introduction of the gases into the stream of liquid takes place inside the guide-member wheel at 5 or 6 (Fig. 2) or at the connection of the guide-member wheel and the rotating-member part (6—1 Fig. 1), for example, by constructing the separating walls or blades of the guide-wheel 5 to 6 hollow (12 and 14 Fig. 5). In this case air or gas enters the hollow spaces of the blades of the guide-wheel and is distributed through slits or recesses 17 at the ends of the blades into the stream of liquid. The guide-wheel can be so arranged that the blades or their hollow part are alternately connected with the gas- and air channels 14 and 12. It is preferable to introduce gas and air at different places, in order to have them compressed separately before combustion.

The shape of the different channels is represented in the upper half of Fig. 3 for the rotating-member part and in the lower half thereof for the guide-member wheel; the sections are in both cases seen from the left in the Figs. 1 and 2. Fig. 4 shows the channels of the rotating-member part looking from outside toward the axle. The illustrated form of channels is suitable for high numbers of revolutions and high pressures. For obtaining particular effects or smaller pressures, the channels can be more radial or bent with respect to the rotation forward as in water turbines and pumps. Figs. 3 and 4 make it evident how the gases escaping at 10 in Fig. 1 can be led between the various channels through suitable spaces or openings into an exhaust chamber 98 (F. 2) or into the atmosphere.

Figure 16:
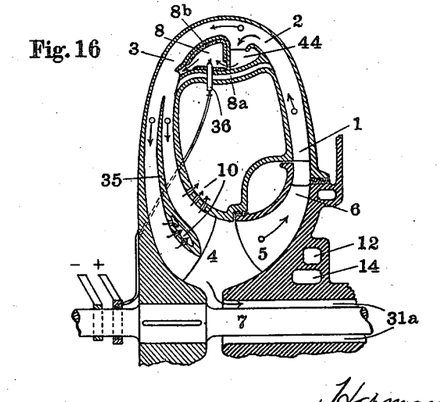

Fig. 3 shows above in the middle a section on the line $a$—$b$ of Fig. 4 perpendicular to the axle through the combustion-chamber 8 and the channel 2 to 3 lying around it. The combustion-chamber can, of course, be provided on its sides and toward the axle with a cooling-mantle fed by the auxiliary liquid flowing around it and its inner walls are preferably lined with a heat-insulating material 8$^b$ (Fig. 16). In Figs. 3 and 4 the combustion-chambers are illustrated as separated from each other;

they can however form a continuous circumferential hollow ring (Fig. 16) so that the pressure is everywhere equal. In the case of separate chambers small arched connection-pipes 8ᶜ can be used. (Figs. 3 and 4 in dotted lines).

The rotor may be made either as a smooth hollow-cast body (Fig. 2) in which walls for the formations of channels are cast, or the inner part alone can be built as a hollow-cast body, while the outer radiating channels of any convenient cross-section together with the combustion-chambers are attached thereto by screws, wedges or the like, either singly or in groups.

This arrangement is shown by way of example in Figs. 13 and 14 in which the guide-wheel tubes 73 and 74 for the outwardly and inwardly leading branches are attached to the channels formed in the central body 72, while the outer ends of said tubes extend into and are connected to a ring like body 75 provided with the outer channels 2—3 of the circuit and the combustion chamber 8. In order that the losses by windage work shall not be too high, a smooth thin covering 76 with exhaust-slits can be mounted to encircle the rotor.

Figures 6, 7, 8, 9:
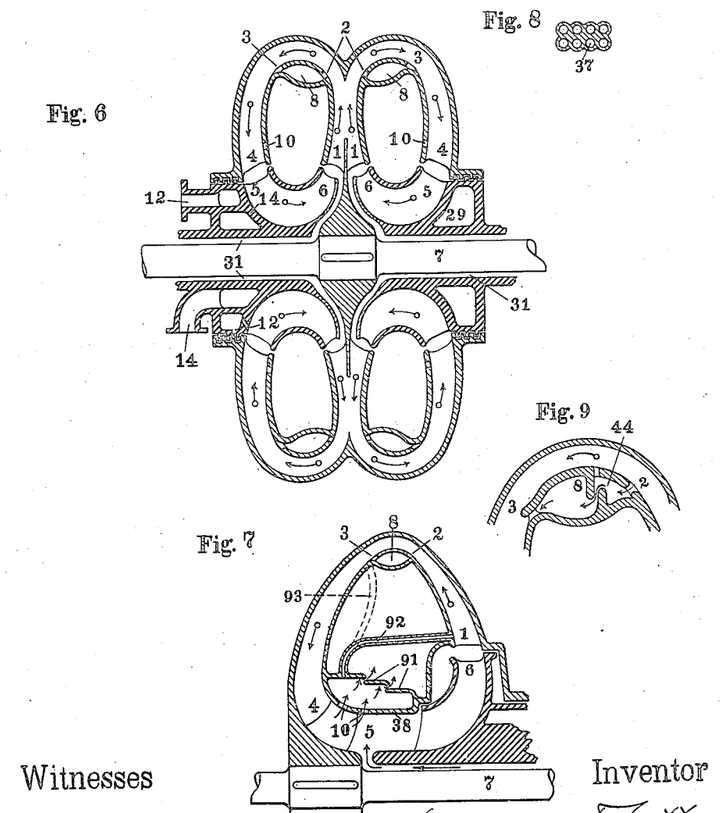
Fig. 6 is a cross-section of an engine having two circuits.
Fig. 7 is a partial cross-section of a modification of the engine, illustrating some details.
Fig. 8 is a cross-section of a modification of a channel.
Fig. 9 is a partial cross-section of the rotor representing a modification of the combustion-chamber.

At any places of the circuit the channels can be divided by lengthwise arranged partitions into two or more parallel channels, in order to better conduct the current, where the gases have a very high volume. The division of the channels into a number of channels 37 of small width or separate pipes is illustrated in Fig. 8. The object of this construction is to guide the bubbles which are separated the one from the other in the small pipes by water-plungers. Thus, the mixture is maintained.

As shown in Fig. 1 the admission opening of the combustion chamber 8 at 2 is radial, so that the centrifugal force will separate the gases from the auxiliary fluid. Partitions can be arranged forming two chambers 8 and 44, as illustrated in Fig. 9, in order to secure the said separation and to prevent the auxiliary fluid from entering the combustion-chamber 8 proper. The said admission opening can also be given any suitable width, as represented in Figs. 13 and 16 which will cause the formation of a large level and thus facilitate separation of the gases from the auxiliary liquid.

Fig. 6 shows two gas-turbines arranged side-by-side upon the same shaft and connected with one another at a suitable place, e. g., as represented, by the outward-leading branches 1 to 2 of the rotating-member part, or on the inward-leading branches 3 to 4, or through the guide-member wheels 5 to 6. The admission of gas and air can take place either in one circuit (Fig. 6) or by symmetrical arrangement in both guide-member wheels. The one turbine can be made disconnectible or inoperative by means of closing apparatus or valves, such as slides as known in water-turbines and which are displaceable in the joints between the rotor and the guide-wheel, so as to prevent circulation in the circuit.

The exhaust of the expanded gases can take place through passages arranged near the axle or at any other suitable place, instead of through the perforations 10, as the bubbles will assemble themselves at the place of lowest pressure in the channel. In Fig. 7 a large exhaust chamber 38 is provided to facilitate the removal of the gases, while a number of exhaust openings 10 permit of their quick escape.

Another example of the increase of the number of exhaust ports 10 is shown in Fig. 16.

To avoid splashing of the water which might be carried out with the gas through the openings 10 against the combustion-chamber 8, a partition 90 (Fig. 1) can be mounted inside the hollow ring, which partition catches the water and carries it back through a clearance or openings into the circuit. Several similar partitions 91 with various outlets for the gases can be provided (Fig. 7) for collecting the water which is then led back through pipes 92 or 93 into the channels 1 to 2 or 3 to 4 respectively.

The guide-member wheel 5 to 6 may be arranged rotary in opposite direction, instead of stationary, as known in steam-turbines with oppositely rotating bucket-wheels.

As an auxiliary liquid, besides water and sea-water, certain liquids are particularly suitable, especially such liquids which have a very high boiling-point, a high specific weight, and a very low coefficient of heat absorption and small internal friction. A high specific weight gives very high centrifugal force and therefore very high pressure in the combustion-chamber (for example, solutions of salts, organic liquids, such as tetrabromacetylene, quicksilver). The transmission of warmth from the glowing bubbles can be strongly reduced by hot oils with a high boiling-point.

It is preferable to make use of the auxiliary liquids at as high a temperature as possible, in order to decrease the transmission of heat at the high temperatures. If the auxiliary liquid is at a higher temperature than its boiling point, a part of it evaporates into the outblown gases in the exhaust chamber and is carried away with them. If necessary the evaporated auxiliary liquid can be recovered by a condenser of a convenient construction through which the exhaust gases pass.

With oil-turbines the oil itself can be used at a high temperature as auxiliary liquid, the corresponding compressed air being simply mixed with it; by the use of some igniter the inflammation can be procured in the combustion-chamber. The air burns then to a certain extent in oil, and the evaporating unburnt oil must, of course, be saved by condensation.

An intermittent admission of gas and air may take place, for the purpose of producing a pulsatory operation which will have a certain influence on the dimension and the movement of the bubbles.

The engine above described can also be employed as a generator of fluid under high pressure; in this case part of the auxiliary fluid is discharged and collected in an accumulator or utilized directly. This effect may be obtained besides the generation of power. A type adapted for this purpose has been described in connection with Fig. 10.

The engine can be started by the admission of air or fluid under high pressure, until the turbine-wheel attains the required number of revolutions, or the turbine wheel or the guide-member may be rotated directly in opposite direction so that the circulation of the auxiliary fluid is caused.

This invention may be performed in different ways of which several examples of embodiments have been represented in the drawings. I, therefore, do not wish to be limited to the illustrated construction, but what I broadly claim as my invention, and desire to secure by Letters Patent, is—

1. In a gas-turbine for the purposes hereinbefore described, the combination with a guide-member, of a turbine-wheel having a series of blades mounted thereon and rotary relatively to said guide member, a plurality of inclosed combustion chambers carried by and rotary with the blades, and an auxiliary fluid circulating in the said guide and turbine-wheel.

2. In a gas-turbine, the combination with a rotary turbine-wheel having a series of blades mounted thereon, of a stationary guide-member, the said turbine wheel and guide member forming a closed circuit, inclosed combustion-chambers for the driving-medium carried by the blades, and an aux. iary fluid circulating in said circuit.

3. In a gas-turbine, the combination with a rotary turbine-wheel provided with a series of blades, each of said blades having an inclosed combustion-chamber formed thereon, of a guide-member, the said turbine wheel and guide member constituting a closed circuit which is in open connection with the combustion-chambers, and an auxiliary fluid circulating in said circuit.

4. In a gas turbine, the combination with a rotary turbine wheel having a series of blades mounted thereon, of a guide member, said wheel and guide member forming a closed circuit in the shape of a hollow ring by the continuity of their channels, inclosed combustion chambers for the driving medium carried by and rotating with the turbine blades and being in open connection with said circuit, and an auxiliary fluid circulating in said circuit.

5. In a gas-turbine, the combination with a turbine-wheel provided with a series of blades, a plurality of said blades having an inclosed combustion-chamber rotary therewith, of a guide-member, an auxiliary fluid circulating in said wheel and guide member, and admission- and exhaust-passages in said wheel and guide member for the driving medium.

6. In a gas-turbine, the combination with a guide-member, of a rotary turbine-wheel, having a branch adapted to compress the driving medium, an inclosed combustion-chamber carried by and rotary with said turbine wheel, and a branch adapted to receive the driving impulse, and an auxiliary fluid circulating in said wheel and guide member and capable of being mixed with the driving medium.

7. In a gas-turbine, the combination with a guide member, of a rotary turbine-wheel encircling the guide-member, a combustion-chamber formed on the turbine-wheel near its periphery, an auxiliary fluid, and means for exhausting and admitting part of said fluid for cooling purposes.

8. In a gas-turbine, the combination with a guide member, of a turbine-wheel, said wheel and guide member forming a closed circuit, an auxiliary fluid circulating in said circuit, a combustion-chamber formed on the inner side of the turbine-wheel near its periphery, and means for admitting to, and exhausting the driving medium from the auxiliary fluid.

9. In a gas-turbine, the combination with a turbine-wheel having a series of turbine blades mounted thereon, of inclosed combustion chambers carried by and rotary with said turbine blades and means whereby an auxiliary fluid may be circulated in said turbine wheel.

10. In a gas-turbine, the combination with a rotary turbine-wheel having a series of turbine blades mounted thereon, and inclosed combustion chambers carried by said blades, of a stationary guide member, the said wheel and member being channeled to form a closed circuit.

11. In a gas-turbine, the combination with a rotary turbine-wheel having a series of turbine blades mounted thereon, and inclosed combustion chambers carried by said blades, of a stationary guide member, the said wheel and member being channeled to form a closed circuit, and an auxiliary fluid circulating in said circuit.

12. In a gas-turbine, the combination with a turbine-wheel having a series of turbine blades mounted thereon, of inclosed combustion chambers carried by and rotary with said turbine blades, and an auxiliary driving fluid circulating in said turbine-wheel.

13. In a gas-turbine, the combination with a rotary turbine-wheel having a series of turbine blades mounted thereon, and inclosed combustion chambers carried by said blades, of a stationary guide member, the said wheel and member being channeled to form a closed circuit, said closed circuit being in communication with the combustion chamber.

14. In a gas-turbine, the combination with a guide-member, of a turbine-wheel having a series of turbine blades mounted thereon, each of said blades being provided with an inclosed combustion-chamber, and an auxiliary liquid, the turbine-wheel having channels of such construction that the combustion-gases can be mixed with the auxiliary liquid, while the mixture during its inward movement imparts a driving impulse to the turbine-wheel.

15. In a gas-turbine for the purposes hereinbefore described, the combination with a turbine-wheel having a combustion-chamber, of a guide-member, and an auxiliary liquid constantly circulating in said wheel and member, and capable of being mixed with a driving medium admitted to the circuit, means for compressing and delivering mixture to the said combustion-chamber, to be further mixed with the combustion-gases and energized by the same, so as to operate the turbine wheel by the expansion of the mixture, and to exhaust the combustion-gases.

16. In a gas turbine, the combination with a turbine wheel, of an inclosed combustion chamber carried by said wheel, a guide member; said wheel and guide member being constructed to form a closed circuit, and an auxiliary fluid circulating in said circuit.

In testimony whereof I have signed my name to this specification in the presence of two subscribing witnesses.

HERMANN FÖTTINGER.

Witnesses:
FRANCIS R. STEWART,
CHARLES A. HALLEY, Jr.